US012810603B2

(12) United States Patent
Bufi

(10) Patent No.: US 12,810,603 B2
(45) Date of Patent: Nov. 24, 2026

(54) SYSTEM, METHOD, AND COMPUTER DEVICE FOR ARTIFICIAL INTELLIGENCE VISUAL INSPECTION USING A MULTI-MODEL ARCHITECTURE

(71) Applicant: Musashi AI North America Inc., Waterloo (CA)

(72) Inventor: Martin Bufi, Waterloo (CA)

(73) Assignee: Musashi Al North America Inc., Waterloo (CA)

( * ) Notice: Subject to any disclaimer, the term of this patent is extended or adjusted under 35 U.S.C. 154(b) by 252 days.

(21) Appl. No.: 18/274,322

(22) PCT Filed: Jan. 25, 2022

(86) PCT No.: PCT/CA2022/050101
§ 371 (c)(1),
(2) Date: Jul. 26, 2023

(87) PCT Pub. No.: WO2022/160041
PCT Pub. Date: Aug. 4, 2022

(65) Prior Publication Data
US 2024/0087303 A1 Mar. 14, 2024

Related U.S. Application Data

(60) Provisional application No. 63/141,734, filed on Jan. 26, 2021.

(51) Int. Cl.
*G06V 10/70* (2022.01)
*G06T 7/00* (2017.01)
(Continued)

(52) U.S. Cl.
CPC .............. *G06V 10/87* (2022.01); *G06T 7/001* (2013.01); *G06V 10/764* (2022.01); *G06V 10/82* (2022.01);
(Continued)

(58) Field of Classification Search
None
See application file for complete search history.

(56) References Cited

U.S. PATENT DOCUMENTS 9,818,048 B2 * 11/2017 Kiapour ................. G06Q 30/00
11,430,030 B1 * 8/2022 Tagra ....................... G06N 3/08
(Continued)

FOREIGN PATENT DOCUMENTS

WO 2019057987 A1 3/2019

OTHER PUBLICATIONS

Zou, X., Zhou, L., Li, K. et al. Multi-task cascade deep convolutional neural networks for large-scale commodity recognition. Neural Comput & Applic 32, 5633-5647 (2020). https://doi.org/10.1007/s00521-019-04311-9. (Year: 2020).*
(Continued)

*Primary Examiner* — Sath V Perungavoor
(74) *Attorney, Agent, or Firm* — Own Innovation; Osman Ismaili; James W. Hinton

(57) ABSTRACT

Systems, methods, and computer devices for automated artificial intelligence visual inspection using a multi-model architecture are provided. The computer device includes a communication interface for receiving image data; a memory for storing the image data, a first neural network model, a second neural network model, and a second neural network model triggering condition; and a processor in communication with the memory. The processor is configured to: perform a first object detection task on the image data using the first neural network model; store first neural network model output data in the memory; determine whether the first neural network model output data satisfies the second model triggering condition; and, if the first neural network model output data satisfies the second model trig-
(Continued)

600 gering condition: perform a second object detection task on the image data using the second neural network model.

18 Claims, 9 Drawing Sheets

(51) Int. Cl.

| | |
|---|---|
| ***G06V 10/764*** | (2022.01) |
| ***G06V 10/82*** | (2022.01) |
| ***G06V 20/70*** | (2022.01) |

(52) U.S. Cl.

CPC .......... *G06V 20/70* (2022.01); *G06T 2200/24* (2013.01); *G06T 2207/20021* (2013.01); *G06T 2207/20081* (2013.01); *G06T 2207/20084* (2013.01); *G06T 2207/30108* (2013.01)

(56) References Cited

U.S. PATENT DOCUMENTS

| | | | | |
|---|---|---|---|---|
| 11,620,743 | B2 * | 4/2023 | Kohler | G06F 18/2431 382/141 |
| 11,663,815 | B2 * | 5/2023 | Bhate | G06V 10/776 382/152 |
| 2019/0102700 | A1 * | 4/2019 | Babu | G06N 20/00 |
| 2019/0303717 | A1 * | 10/2019 | Bhaskar | G06F 18/214 |
| 2019/0323993 | A1 * | 10/2019 | Mendes Rodrigues | G01N 29/40 |
| 2019/0370955 | A1 * | 12/2019 | Zhang | G06F 18/2431 |
| 2020/0151869 | A1 | 5/2020 | Hu et al. | |
| 2020/0242733 | A1 * | 7/2020 | Kumar | G06N 3/08 |
| 2021/0027103 | A1 * | 1/2021 | Brower | G06N 3/08 |
| 2021/0174200 | A1 * | 6/2021 | Huang | G06N 3/08 |
| 2021/0304400 | A1 * | 9/2021 | Bhate | G06F 18/2148 |
| 2021/0312607 | A1 * | 10/2021 | Lin | G06F 18/214 |
| 2021/0374403 | A1 * | 12/2021 | Yumiba | G06V 10/7715 |
| 2021/0406604 | A1 * | 12/2021 | Collberg | G06F 18/2148 |
| 2022/0261593 | A1 * | 8/2022 | Yu | G06N 3/088 |
| 2022/0383369 | A1 * | 12/2022 | Tagra | G06N 3/08 |
| 2023/0070333 | A1 * | 3/2023 | Tsubaki | G06T 7/0004 |
| 2023/0153989 | A1 * | 5/2023 | Ryan | G06T 7/001 382/149 |
| 2023/0169642 | A1 * | 6/2023 | Floeder | G06T 7/001 382/103 |
| 2024/0420442 | A1 * | 12/2024 | Ranganathan | G06V 10/82 |
| 2025/0029434 | A1 * | 1/2025 | Birgiolas | G06N 20/20 |

OTHER PUBLICATIONS

International Search Report from corresponding PCT application No. PCT/CA2022/050101.

Chen et al., "A Hybrid Deep Learning Based Framework for Component Defect Detection of Moving Trains". IEEE Transactions on Intelligent Transportation Systems. Nov. 10, 2020. DOI: 10.1109/TITS.2020.3034239.

European Patent Office, Extended European Search Report for EP Patent App. No. 22744958.4, issued Jan. 2, 2025.

Liu et al., "Multi-Path Region-Based Convolutional Neural Network for Accurate Detection of Unconstrained 'Hard Faces'", 2017, 14th Conference on Computer and Robot Vision.

* cited by examiner

SYSTEM, METHOD, AND COMPUTER DEVICE FOR ARTIFICIAL INTELLIGENCE VISUAL INSPECTION USING A MULTI-MODEL ARCHITECTURE

TECHNICAL FIELD

The following relates generally to automated visual inspection for manufacturing quality control, and more particularly to systems and methods for automated visual inspection using artificial intelligence ("AI").

INTRODUCTION

Previous approaches to automated visual inspection for manufacturing quality control have focused on training a single model to perform a variety of different object detection tasks, from recognizing whether a particular object is of the class of objects to be analyzed to detecting defects or abnormalities in particular objects. Such an approach is highly challenging and runs the risk that incorporating new training data and functionality into the single model can cause a decrease in performance. Such decrease in performance arises because the model drifts towards newer functionality and accordingly improves on one task while forfeiting competence on another when provided newer data.

Accordingly, training big AI models for multiple different purposes and to perform multiple different tasks often results in increasingly inferior performance, for example in terms of weight sharing, heads of network, and battling for resources.

Accordingly, there is a need for an improved system, method, and device for automated visual inspection tasks that overcomes at least some of the disadvantages of existing systems and methods. Such an improved system, method, and device may advantageously perform automated visual inspection tasks related to object detection.

SUMMARY

A system for automated artificial intelligence ("AI") visual inspection using a multi-model architecture is provided. The system includes: a camera device for acquiring inspection image data of a target object being inspected and an AI visual inspection device. The AI visual inspection device includes a memory storing a second model triggering condition for triggering use of a second neural network model and a processor in communication with the memory. The processor is configured to: execute a first neural network model configured to detect a first object class in the inspection image and generate first neural network model output data including a first list of detected objects; execute a model triggering determination module configured to determine whether the first neural network model output data satisfies the second model triggering condition; execute the second neural network model upon satisfaction of the second model triggering condition, the second neural network model configured to detect a second object class in the inspection image and generate second neural network model output data including a second list of detected objects; send via a communication interface neural network model output data to an operator device, the neural network model output data including the first neural network model output data and, if generated, the second neural network model output data. The operator device is configured to display the received neural network model output data.

In some embodiments, at least one of the first neural network model and the second neural network model is an image segmentation neural network model. In some embodiments, the image segmentation neural network model is an instance segmentation neural network model.

A system for automated artificial intelligence ("AI") visual inspection using a multi-model architecture is provided. The system includes a camera device for acquiring inspection image data of a target object being inspected and an AI visual inspection device. The AI visual inspection device includes: a communication interface for receiving the inspection image data from the camera device; a memory storing a first neural network model configured to detect a first object class in the inspection image data, a second neural network model configured to detect a second object class in the inspection image data, and a second model triggering condition for triggering use of the second neural network model; and a processor in communication with the memory. The processor is configured to: provide the inspection image data as input to the first object detection model; perform a first object detection task using the first neural network model, the first object detection task including generating first neural network model output data; store the first neural network model output data in the memory as inspection image annotation data; and determine whether the first neural network model output data satisfies the second model triggering condition. If the first neural network model output data satisfies the second model triggering condition, the processor is further configured to: provide the inspection image data as input to the second neural network model; perform a second object detection task using the second neural network model, the second object detection task including generating second neural network output data; and store the second neural network model output data in the memory as a subset of the inspection image annotation data. The communication interface is configured to send the inspection image data and the inspection image annotation data to an operator device for display. The system further includes the operator device for displaying the inspection image data and inspection image annotation data as an annotated inspection image.

The inspection image annotation data may be stored as metadata of the inspection image data.

The operator device may be configured to receive input data from a user indicating which of the inspection image annotation data to display and display only the indicated inspection image annotation data in the annotated inspection image.

The first neural network model output data may include an object class label of a detected object, the second model triggering condition may include a required object class label, and the processor may determine whether the object class label of the detected object matches the required object class label.

The first neural network model output data may include object location data of a detected object, the second model triggering condition may include an object location requirement, and the processor may determine whether the object location data of the detected object meets the object location requirement.

The first neural network model output data may include a confidence level of a detected object, the second model triggering condition may include satisfying a minimum confidence level, and the processor may determine whether the confidence level of the detected object meets the minimum confidence level.

The first neural network model output data may include object size data of a detected object, the second model triggering condition may include satisfying a minimum object size, and the processor may determine whether the object size data meets the minimum object size.

The first neural network model output data may include object attribute data describing at least two attributes of a detected object.

The at least two attributes may include any two or more of an object location, an object class label, an object confidence level, and an object size.

The second model triggering condition may include a requirement for each of the at least two attributes of the detected object, and the processor may be further configured to determine whether the object attribute data satisfies the requirement for each of the at least two attributes of the detected object.

The first neural network output data may include an identifier that identifies that the second model triggering condition is to be used by the processor.

The processor may determine the second model triggering condition is to be used based on the identifier.

Upon determining the second model triggering condition is to be used, the processor may retrieve the second model triggering condition from the memory using the identifier in order to determine whether the first neural network model output data satisfies the second model triggering condition.

The identifier may comprise model identification data identifying the first neural network model.

The inspection image data provided to the second neural network model may comprise a subset of the inspection image data, the subset of the inspection image data may be determined from the first neural network model output data, and the second object detection task may be performed using the subset of the inspection image data.

The processor may be further configured to generate a list of neural network models to be executed by the processor based on the first neural network model output data, the list of neural network models to be executed including the second neural network model when the processor determines that the second model triggering condition is satisfied.

The processor may execute each of the neural network models in the list in series, the execution of a respective one of the neural network models including providing at least a subset of the inspection image data to the respective one of the neural network models and generating neural network model output data using the respective one of the neural network models.

The processor may be further configured to dynamically update the list to include an additional neural network model to be executed. The additional neural network model to be executed may be determined by the processor based on neural network output data generated by a previously executed neural network model satisfying a model triggering condition of the additional neural network model stored in the memory.

The list of neural network models to be executed may comprise a plurality of separate lists of neural network models to be executed, each respective one of the plurality of separate lists of neural network models to be executed corresponding to a single neural network model.

The operator device may be configured to generate a user interface for receiving input data setting the second model triggering condition, and the second model triggering condition may be generated by either the operator device or the AI visual inspection device according to the input data.

In some embodiments, at least one of the first neural network model and the second neural network model is an image segmentation neural network model. In some embodiments, the image segmentation neural network model is an instance segmentation neural network model.

A computer-implemented method of automated artificial intelligence ("AI") visual inspection using a multi-model architecture is provided. The method includes: providing inspection image data as input to a first neural network model configured to detect a first object class in the inspection image data; performing a first object detection task using the first neural network model, the first object detection task including generating first neural network model output data; storing the first neural network model output data in a memory as inspection image annotation data; determining whether the first neural network model output data satisfies a second model triggering condition stored in the memory; if the first neural network model output data satisfies the second model triggering condition: providing the inspection image data as input to a second neural network model configured to detect a second object class in the inspection image data; performing a second object detection task using the second neural network model, the second object detection task including generating second neural network output data; and storing the second neural network output data in the memory as a subset of the inspection image annotation data.

The method may further include generating an annotated inspection image using the inspection image data and the inspection image annotation data.

The method may further include displaying the annotated inspection image in a user interface.

In some embodiments, at least one of the first neural network model and the second neural network model is an image segmentation neural network model. In some embodiments, the image segmentation neural network model is an instance segmentation neural network model.

A computer device for performing object detection using a multi-model architecture is also provided. The device includes: a communication interface for receiving image data; a memory for storing the image data, a first neural network model configured to detect a first object class in the image data, a second neural network model configured to detect a second object class in the image data, and a second neural network model triggering condition; and a processor in communication with the memory. The processor is configured to: perform a first object detection task on the image data using the first neural network model to generate first neural network model output data; store the first neural network model output data in the memory; determine whether the first neural network model output data satisfies the second model triggering condition; and if the first neural network model output data satisfies the second model triggering condition: perform a second object detection task on the image data using the second neural network model to generate second neural network output data; and store the second neural network model output data in the memory.

In some embodiments, at least one of the first neural network model and the second neural network model is an image segmentation neural network model. In some embodiments, the image segmentation neural network model is an instance segmentation neural network model.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
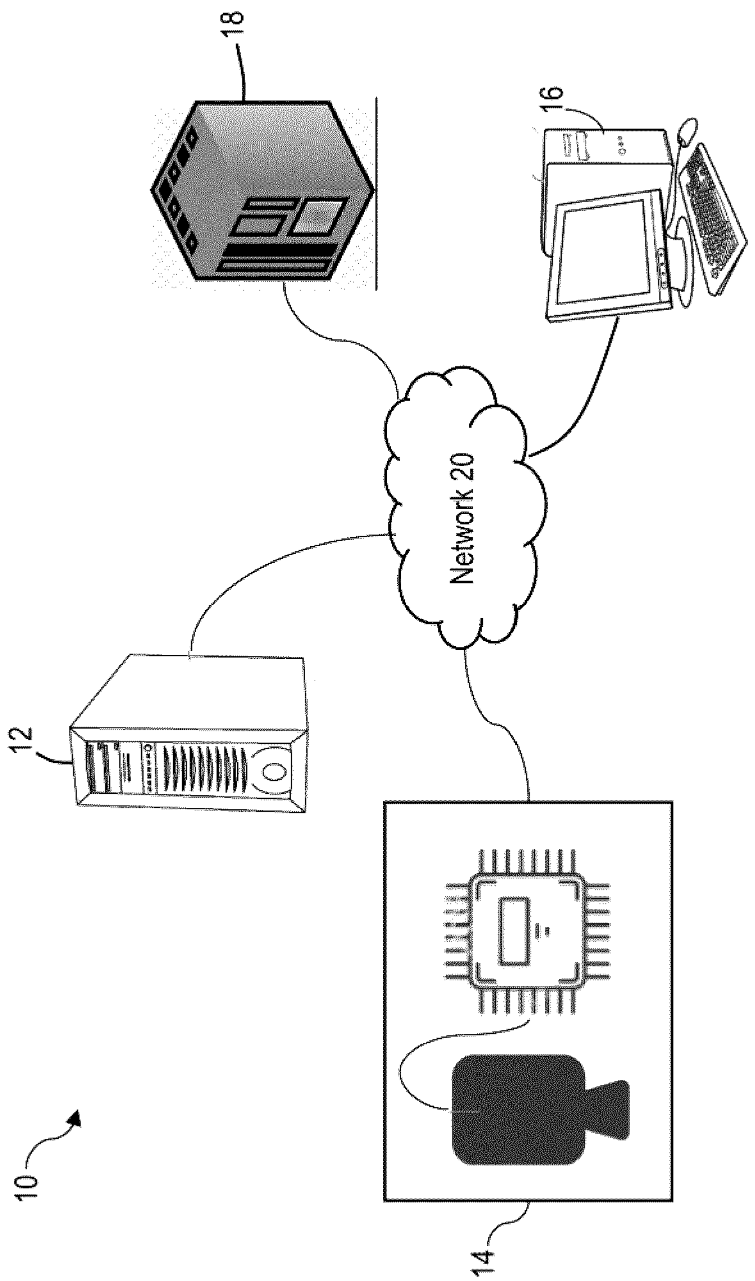
FIG. 1 is a schematic diagram of a system for automated visual inspection, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to automated visual inspection for manufacturing quality control, and more particularly to systems and methods for automated visual inspection using artificial intelligence ("AI"). The present disclosure provides systems, methods, and devices for artificial intelligence-based image analysis and visual inspection using a multi-model architecture. The multi-model architecture includes a plurality of machine learning models, such as neural networks. In an embodiment, the neural network is an object detection model. Generally, each neural network has been trained to perform a particular task. Model triggering conditions are used to automatically determine, based on a neural network output generated by one or more neural networks in the multi-model architecture, whether to trigger use of another neural network in the multi-model architecture. Triggering use of the neural network may include retrieving an image being analyzed (or a portion thereof) from data storage and providing the image to an input layer of the triggered neural network such that the triggered neural network processes the input data to generate a neural network output. The multi-model architecture implemented by the systems and methods of the present disclosure may function as a type of decision tree with neural networks which includes the architecture of the models and specific logic between the models determining what models are triggered by what model outputs.

As used herein, the term "object detection" is intended to refer generally to computer vision techniques in which objects are detected or identified in a digital image. The term "object detection" as used in the present disclosure includes but is not intended to be limited to the specific computer vision technique of "Object Detection" in which all instances of known object classes are localized and classified in a digital image. For example, the term "object detection" as used herein is intended to include image segmentation techniques in which presence of objects in a digital image are marked using pixel-wise masks for each object in the image. One particular example of image segmentation is instance segmentation in which objects in a digital image are detected and segmented via the localization of specific objects and the association of their belonging pixels. Instance segmentation includes identifying each object instance for every known object within a digital image and includes assigning a label to each pixel of the digital image. Accordingly, reference to "model", "object detection model", "neural network", "object detection neural network", or the like are intended to include embodiments in which an instance segmentation model or neural network is used and embodiments in which an "Object Detection" model or neural network is used.

In an industrial and/or commercial setting, a variety of parts may need to be analyzed for mechanical fitness before delivery to or use by a customer. Similarly, each of the variety of parts may be subject to many different classes of defects or abnormalities. Such defects may render a part defective such that a manufacturer thereof may not be able to sell the part while retaining customer loyalty and/or complying with applicable laws and/or regulation. Such abnormalities may not render a part so defective. Nevertheless, it may be advantageous to the manufacturer to be aware of what defects and/or abnormalities are arising on which parts. Such knowledge may allow a manufacturer to trace problems to particular machines, processes, supplies, or precursors. Such knowledge may further allow a manufacturer to correct and prevent the defects or abnormalities revealed under analysis.

Detailed analysis of each of the variety of parts may be costly as a function of time. Human workers are generally not as capable as a computer or machine of performing a detail-intensive, rote task for long periods of time without concomitant losses in detail in the short term and job satisfaction in the long term. Accordingly, it is highly advantageous to the manufacturer to use a system for automated visual inspection to analyze the parts and detect the defects and/or abnormalities.

However, while it may be possible to train a single "large" model to perform each of a variety of object detection tasks, this approach may disadvantageously be challenging both for developers and users of the model or system. Even where the manufacturer is able to supply new data in order to retrain and update the model, such retraining and updating may further disadvantageously cause the model to drift towards particular tasks, i.e., to improve on a new task while worsening with respect to another. Further concerns with respect to a single "large" model include, weight-sharing, and heads of network concerns. When training single large networks for multiple tasks, issues may be encountered regarding having "tasks" fight for capacity. This is because the model will sometimes try to optimize its overall loss which could affect the single accuracy of a specific task negatively. To overcome this problem, a loss is connected to each task and the model then tries to optimize all of them simultaneously. This remains an area of active research for which there is no solution. If you have the compute budget during test time (running inference at the edge), you will tend to have much higher accuracy with singular smaller models for each task. As a further disadvantage of a single "large" model, regression testing is difficult. It is hard to know how new data and new tasks affect the previous tasks when they are all sharing weights and gradients. Therefore, it is hard to pinpoint what may be causing inconsistencies in large multi-head models.

Because of the variety of tasks that the system for automated visual inspection must perform (e.g., object identification, defect detection, defect localization), it is advantageous to have a system whose performance on one task does not suffer in order to make room for performance on another task. Accordingly, it may be highly advantageous to the manufacturer to have a system composed of several "smaller" models, each performing its own specified task, the results of which tasks may be integrated by the system as a single output.

While the present disclosure describes the invention in the context of defect detection and visual inspection of objects (including manufacturing quality control and visual inspection), the systems, methods, and devices provided herein may have further applications and different uses beyond those described herein, whether in the context of defect detection and visual inspection of objects or otherwise (e.g. other computer vision applications such as self-driving vehicles, medical image analysis, robotics using manipulation, etc.). Machine-learning models described herein, whether called models or object detection models, may in other embodiments be other forms of machine learning models configured to perform machine learning tasks other than object detection. For example, the multi-model architecture may include a plurality of neural networks configured to perform object detection or other image processing tasks. Input data may vary in those cases, as may output data, but elements of the present disclosure, such as multiple models and triggering conditions, may operate similarly, as would data aggregation at the end of the process(es) herein disclosed.

As described herein, the present disclosure provides a multi-model architecture including a plurality of neural networks configured to receive input data and generate at least one output. The neural network may be a feed-forward neural network. The neural network may have a plurality of processing nodes. The processing nodes may include a multi-variable input layer having a plurality of input nodes, at least one hidden layer of nodes, and an output layer having at least one output node. During operation of the neural network, each of the nodes in the hidden layer applies an activation/transfer function and a weight to any input arriving at that node (from the input layer or from another layer of the hidden layer). The node may provide an output to other nodes (of a subsequent hidden layer or to the output layer). The neural network may be configured to perform a regression analysis providing a continuous output, or a classification analysis to classify data. The neural networks may be trained using supervised or unsupervised learning techniques, as described below. According to a supervised learning technique, a training dataset is provided at the input layer in conjunction with a set of known output values at the output layer. During a training stage, the neural network may process the training dataset. It is intended that the neural network learn how to provide an output for new input data by generalizing the information it learns in the training stage from the training data. Training may be effected by back propagating the error to determine weights of the nodes of the hidden layers to minimize the error. Once trained, or optionally during training, test or verification data can be provided to the neural network to provide an output. A neural network may thus cross-correlate inputs provided to the input layer to provide at least one output at the output layer. The output provided by a neural network in each embodiment is preferably close to a desired output for a given input, such that the neural network satisfactorily processes the input data.

Referring now to FIG. 1, shown therein is an automated visual inspection system 10, in accordance with an embodiment. The system 10 includes an AI visual inspection device 12, which communicates with a camera device 14, an operator device 16, and a programmable logic controller ("PLC") device 18 via a network 20.

The AI visual inspection device 12 may be configured to perform object detection tasks. The AI visual inspection device 12 may include multiple object detection models. Each object detection model may be a model trained to perform a particular object detection task. Object detection includes detecting instances of certain objects belonging to a certain class within input data, such as the input data presented to the AI visual inspection device 12. The object detection model may include deep learning techniques, such as neural networks (e.g. convolutional neural networks or CNNs), and machine-learning approaches. In machine-learning object detection approaches, relevant features of the sought object(s) are defined in advance, while such definition is not required in neural networks.

The AI visual inspection device 12 may also be configured to perform tasks outside the context of object detection. Such tasks may include other forms of machine learning ("ML") or artificial intelligence tasks or non-ML tasks.

The devices 12, 14, 16, 18 may be a server computer, node computing device (e.g., JETSON computing device or the like), embedded device, desktop computer, notebook computer, tablet, PDA, smartphone, or another computing device. The devices 12, 14, 16, 18 may include a connection with the network 20 such as a wired or wireless connection to the Internet. In some cases, the network 20 may include other types of computer or telecommunication networks. The devices 12, 14, 16, 18 may include one or more of a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage or may be received from the Internet or other network 20.

Input device may include any device for entering information into device 12, 14, 16, 18. For example, input device may be a keyboard, keypad, cursor-control device, touchscreen, camera, or microphone. Display device may include any type of device for presenting visual information. For example, display device may be a computer monitor, a flat-screen display, a projector, or a display panel. Output device may include any type of device for presenting a hard copy of information, such as a printer for example. Output device may also include other types of output devices such as speakers, for example. In some cases, device 12, 14, 16, 18 may include multiple of any one or more of processors, applications, software modules, second storage devices, network connections, input devices, output devices, and display devices.

Although devices 12, 14, 16, 18 are described with various components, one skilled in the art will appreciate that the devices 12, 14, 16, 18 may in some cases contain fewer, additional or different components. In addition, although aspects of an implementation of the devices 12, 14, 16, 18 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18 and/or processor to perform a particular method.

Devices 12, 14, 16, 18 can be described performing certain acts. It will be appreciated that any one or more of these devices may perform an act automatically or in response to an interaction by a user of that device. That is, the user of the device may manipulate one or more input devices (e.g., a touchscreen, a mouse, or a button) causing the device to perform the described act. In many cases, this aspect may not be described below, but it will be understood.

As an example, it is described below that the devices 12, 14, 16, 18 may send information to one or more other device 12, 14, 16, 18. For example, a user using the operator device 16 may manipulate one or more inputs (e.g., a mouse and a keyboard) to interact with a user interface displayed on a display of the device 16. Generally, the device may receive a user interface from the network 20 (e.g., in the form of a webpage). Alternatively, or in addition, a user interface may be stored locally at a device (e.g., a cache of a webpage or a mobile application).

The devices 12, 14, 16, 18 may be configured to receive a plurality of information, from one or more of the plurality of devices 12, 14, 16, 18.

In response to receiving information, the respective device 12, 14, 16, 18 may store the information in storage database. The storage may correspond with secondary storage of one or more other devices 12, 14, 16, 18. Generally, the storage database may be any suitable storage device such as a hard disk drive, a solid-state drive, a memory card, or a disk (e.g., CD, DVD, or Blu-ray etc.). Also, the storage database may be locally connected with the device 12, 14, 16, 18. In some cases, storage database may be located remotely from the device 12, 14, 16, 18 and accessible to the device 12, 14, 16, 18 across a network for example. In some cases, storage database may comprise one or more storage devices located at a networked cloud storage provider.

The AI visual inspection device 12 may be a purpose-built machine designed specifically for performing object (e.g., defect) detection tasks, object (e.g., defect) classification tasks, golden sample analysis tasks, object (e.g., defect) tracking tasks, and other related data processing tasks using an inspection image captured by the camera device 14.

The camera device 14 captures image data. The image data may include a single image or a plurality of images. The plurality of images (frames) may be captured by the camera 14 as a video. To image an area of an object to be inspected (which may also be referred to as "inspected object" or "target object"), the camera 14 and the object to be inspected may move relative to one another. For example, the object may be rotated and a plurality of images captured by the camera 14 at different positions to provide adequate inspection from multiple angles. The camera 14 may be configured to capture a plurality of frames, wherein each frame is taken at a respective position (e.g., if the object is rotating relative to the camera 14).

The object to be inspected (not shown) may be any physical article on which a user of the system 10 desires to perform visual inspection. The object to be inspected may be susceptible to developing defects during a manufacturing or machining process. Defects may be characterized as unacceptable deviations from a "perfect" or "good" article. An object to be inspected having a defect is considered defective, unacceptable, or "not good" ("NG"). The system 10 inspects the object and determines whether the object has a defect. Objects may be classified as defective or non-defective by the system 10. By identifying objects as defective or non-defective, the inspected objects can be differentially treated based on the outcome of the visual inspection. Defective objects may be discarded or otherwise removed from further processing. Non-defective objects may continue with further processing.

Generally, the object to be inspected may be an object in which defects are undesirable. Defects in the object to be inspected may lead to reduced functional performance of the object or of a larger object (e.g., system or machine) of which the object to be inspected is a component. Defects in the object to be inspected may reduce the visual appeal of the article. Discovering defective products can be an important step for a business to prevent the sale and use of defective articles and to determine root causes associated with the defects so that such causes can be remedied.

The object to be inspected may be a fabricated article. The object to be inspected may be a manufactured article that is prone to developing defects during the manufacturing process. The object may be an article which derives some value from visual appearance and on which certain defects may negatively impact the visual appearance. Defects in the object to be inspected may develop during manufacturing of the object itself or some other process (e.g., transport, testing).

The object to be inspected may be composed of one or more materials, such as metal, steel, plastic, composite, wood, glass, etc.

The object to be inspected may be uniform or non-uniform in size and shape. The object may have a curved outer surface.

The object to be inspected may include a plurality of sections. Object sections may be further divided into object subsections. The object sections (or subsections) may be determined based on the appearance or function of the object. The object sections may be determined to facilitate better visual inspection of the object and to better identify unacceptably defective objects.

The object sections may correspond to different parts of the object having different functions. Different sections may have similar or different dimensions. In some cases, the object may include a plurality of different section types, with each section type appearing one or more times in the object to be inspected. The sections may be regularly or irregularly shaped. Different sections may have different defect specifications (i.e. tolerance for certain defects).

The object to be inspected may be prone to multiple types or classes of defects detectable using the system 10. Example defects types may include paint, porosity, dents, scratches, sludge, etc. Defect types may vary depending on the object. For example, the defect types may be particular to the object based on the manufacturing process or material composition of the object. Defects in the object may be acquired during manufacturing itself or through subsequent processing of the object.

Figure 8:
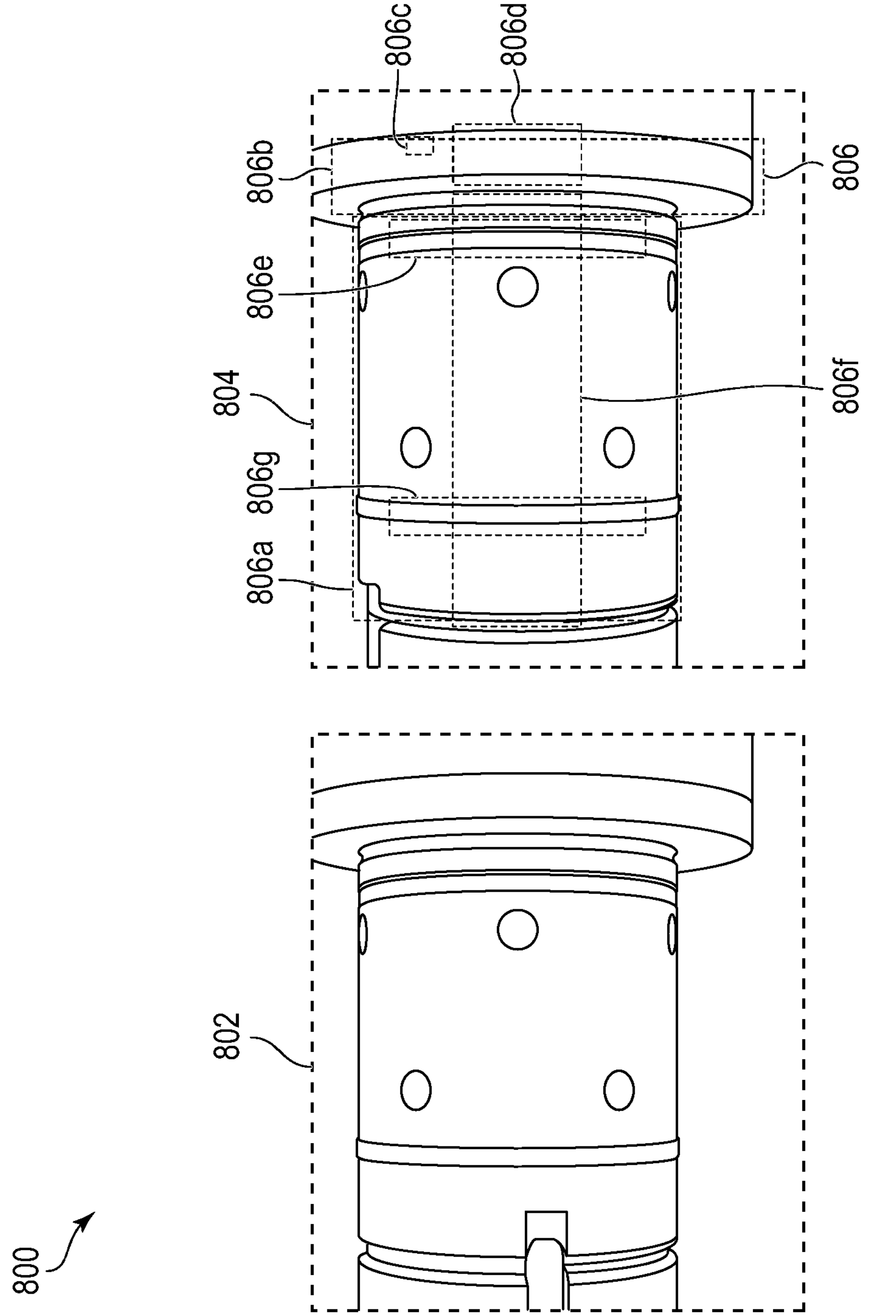
FIG. 8 shows illustrations of an input image and output image of a camshaft provided to and by, respectively, a system for automated visual inspection using a single object detector.
Figure 9:
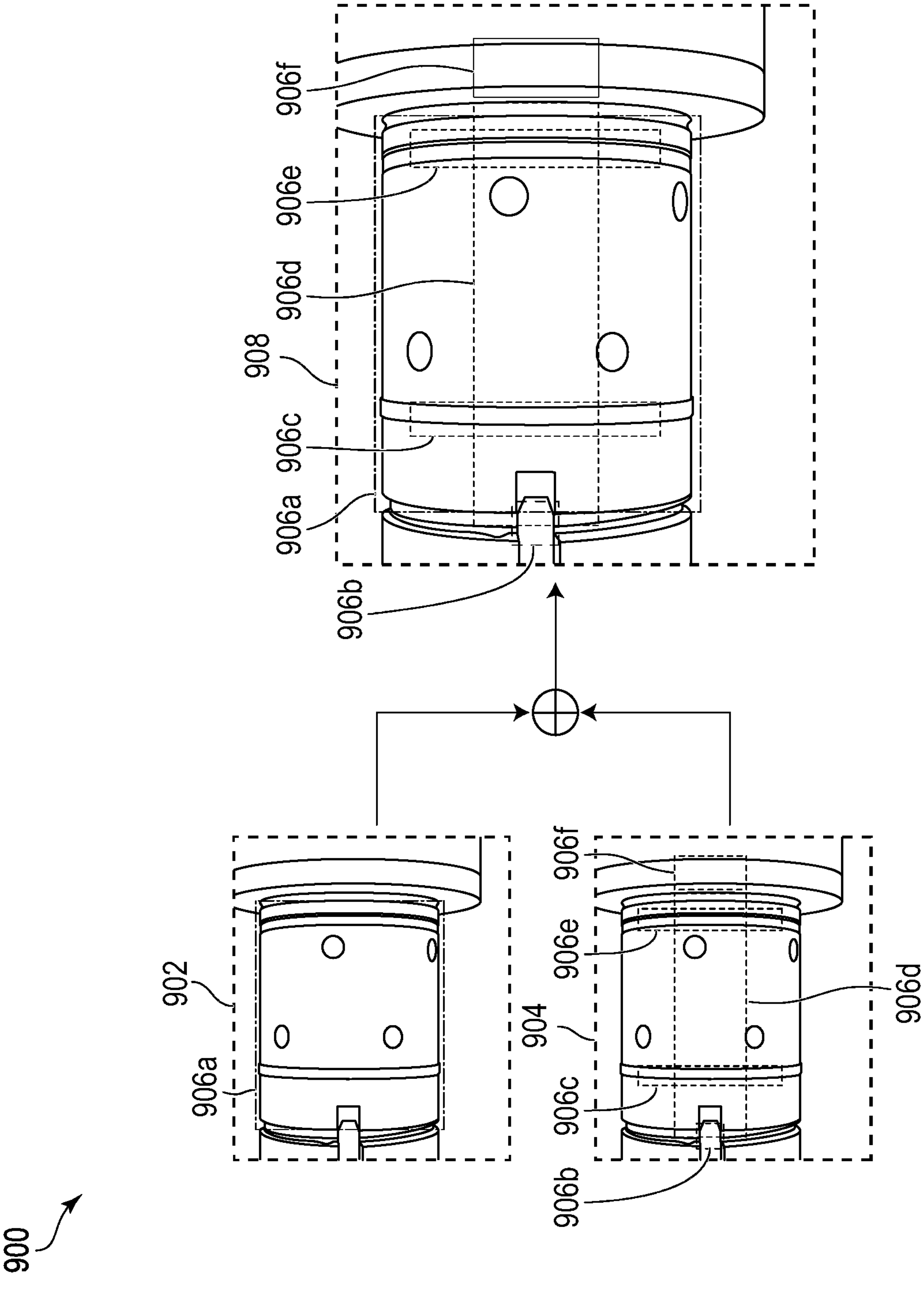
FIG. 9 shows illustrations of first and second output images of a camshaft and a combined annotated output image of the camshaft, which may be generated and used by the systems and methods of the present disclosure, wherein the combined annotated output image is generated using the first and second output images of the camshaft, the first and second output images generated using different automated visual inspection models of a multi-model visual inspection system, according to an embodiment.

The operator device 16 includes a user interface component (or module) (e.g., a human-machine interface). The operator device 16 receives data from the AI visual inspection device 12 via the network 20. The received data may include output data from the camera 14. For example, the output data may include an annotated output image data including artifact data. The artifact data may include location information (e.g., coordinates, bounding box, boundaries of specific instances of objects as in instance segmentation, centroid) and label information such that artifacts (e.g., defects, anomalies) in the inspection image that were identified by AI visual inspection device 12 can be identified visually in a displayed image. Generally, "location information" or "location data" as used herein may include any information or data used to specify the location of or localize an instance of an object in an image and may vary depending on the technique used by the model(s) to detect objects in an image (e.g., Object Detection, instance segmentation). The operator device 16 may include automatic image annotation software for automatically assigning metadata comprising data generated by the AI visual inspection device 12 to a digital inspection image. The operator device 16 provides the output data from the AI visual inspection device 12 to the user interface component, which generates a user interface screen displaying the annotated output image data. For example, the inspection image may be annotated with metadata comprising defect data generated by the components such as defect location information (e.g., bounding box coordinates, centroid coordinates), defect size data, and defect class information. Examples of such annotated output images are illustrated in FIGS. 8 and 9, described below.

The user interface component of the operator device 16 may also render one or more user interface elements for receiving input from the operator. For example, the user interface component may provide a yes/no or similar binary option for receiving user input data indicating a selection of an option. In a particular case, the user interface may present and highlight a particular object detected by AI visual inspection device 12 in an annotated output image data and ask whether the object is an anomaly or not (and receive a corresponding input from the user).

Depending on the input data received from the user, the annotated output image data (or a portion thereof), may be routed differently in the system 10. For example, upon the user interface component of the operator device 16 receiving certain input data (e.g., an answer "no" to a question of whether a given artifact is an anomaly, such as by clicking on a user interface element labelled "no"), the operator device 16 or the AI visual inspection device 12 may be configured to incorporate that new data in its machine learning models. The data so incorporated can be logged as a training sample for a future training dataset that can be used to further train one or more artificial intelligence components of the AI visual inspection device 12. For example, input data provided via the user interface may be used by and cause either the operator device 16 or the AI visual inspection device 12 to tag or otherwise indicate (such as by associating metadata) that a particular image generated by the system 10 is a training sample for a particular object detection model that may be part of a multi-model architecture implemented by the AI visual inspection device 12 or elsewhere within the system 10. Each model in the multi-model architecture may have a model identifier (e.g., a model number, name, or the like) that can be used for this purpose such that the training image can be properly tagged for future use in retraining the applicable model.

The PLC device 18 is configured to control the manipulation and physical processing of the object to be inspected. This may be done by sending and receiving control instructions to an article manipulating unit (not shown) via network 20. Such manipulation and physical processing may include rotating or otherwise moving the object to be inspected for imaging and loading and unloading objects to and from an inspection area. An example instruction sent by the PLC device 18 via the network 20 may be "rotate object by 'n' degrees". In some cases, the transmission of such instruction may be dependent upon information received from the AI visual inspection device 12. In other cases, the control instruction may instruct an actuation or movement of another component of the system 10, such as the camera 14, a conveyor belt, a robotic arm, a mobile robot, or the like via an actuating component in communication with the PLC 18.

The PLC device 18 may store object detection tolerance data. As an example, the object detection tolerance data may be defect tolerance data (e.g., where the system 10 is detecting defects). The defect tolerance data may include a defect class identifier unique to a particular defect class and one or more tolerance values linked to the defect class identifier. In other embodiments, the defect tolerance data may be stored on another device, such as the AI visual inspection device 12. The defect tolerance data may be stored in a defect tolerance database. Defect tolerance data in the defect tolerance database may be referenced using the defect class identifier to facilitate retrieval of tolerance data values for comparison to data generated by the AI visual inspection device 12. The PLC device 18 may further be configured to control manipulation of the object to be inspected. Where a defect in an object to be inspected is detected by the AI visual inspection device 12, the PLC device 18 may compare the detected defect (data associated with or describing attributes of the defect) with defect tolerance data stored at the PLC device 18 or elsewhere to determine whether the part is defective (e.g., by comparing the defect found with defect tolerance data).

For example, in an embodiment, the PLC device 18 is configured to receive data from the AI visual inspection device 12 via the network 20 indicating the outcome of the defect detection process. For example, in cases where a defect has been detected by the AI visual inspection device 12, defect data may be sent to the PLC device 18. The defect data describes attributes of the detected defect and may include, for example, size data, location data, class label data, confidence level data, or the like. The PLC device 18 stores the defect tolerance data. The PLC device 18 analyzes the defect data in view of the tolerance data to determine if the object to be inspected is defective (e.g., "NG") or within tolerance (e.g., "OK"). The PLC device 18 may send a signal to the AI visual inspection device 12 indicating the outcome of the tolerance analysis. Where the PLC device 18 determines the defect data is out of tolerance, the PLC device 18 may stop the inspection of the object to be inspected and initiate a process for the removal of the defective object and loading of a new object. The PLC device 18 may generate a control signal for stopping inspection of the object to be inspected and transmit the control signal to an actuator responsible for manipulating the object to be inspected or to another actuation component.

In cases where the system 10 has not detected a defect in the inspection image, the AI visual inspection device 12 (e.g., via the network 20) sends a signal to the PLC device 18 indicating the outcome of the object detection process which indicates no defects were found in the image (i.e. "OK"). Upon receiving the OK message, the PLC device 18 sends a control signal to an actuator or manipulator of or at the object to be inspected to adjust the current inspection position of the object to be inspected (e.g., rotate the object to be inspected X degrees). In other cases, the control instruction may be sent to another actuating component that is configured to move one or more components in response to the received control signal (e.g., camera actuator).

In other embodiments, the defect tolerance data may be stored at the AI visual inspection device 12 and the tolerance analysis performed by the AI visual inspection device 12. The AI visual inspection device 12 may then send a signal to the PLC device 18 indicating whether the object is defective or not. The PLC device 18 may then generate a control signal in response to the signal received from the AI visual inspection device 12.

Figure 2:
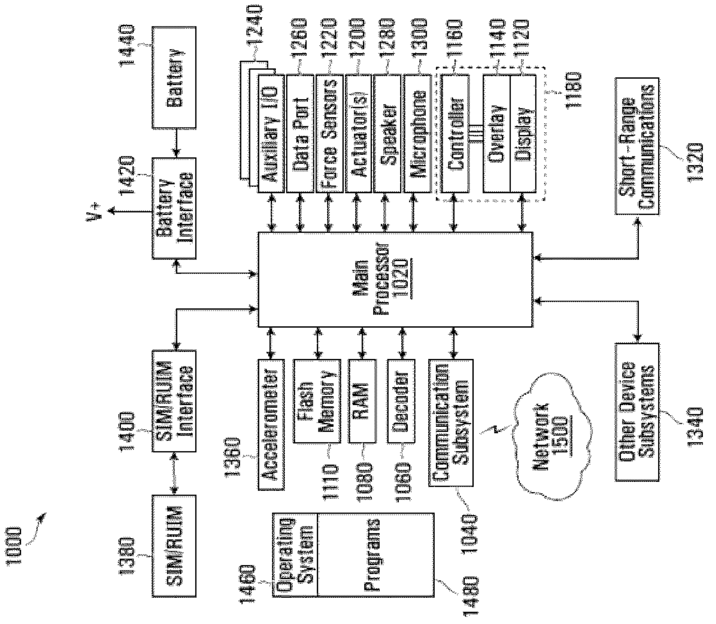
FIG. 2 is a block diagram of a computing device of the present disclosure, according to an embodiment.

Referring now to FIG. 2, shown therein is a block diagram of a computing device 1000 of the system 10 of FIG. 1, according to an embodiment. The computing device 100 may be, for example, any one of devices 12, 14, 16, 18 of FIG. 1.

The computing device 1000 includes multiple components such as a processor 1020 that controls the operations of the computing device 1000. Communication functions, including data communications, voice communications, or both may be performed through a communication subsystem 1040. Data received by the computing device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The computing device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1110, a display 1120 (e.g., with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a computing device generated by the processor 1020 may be displayed on the touch-sensitive display 1180.

The processor 1020 may also interact with an accelerometer 1360. The accelerometer 1360 may be utilized for detecting direction of gravitational forces or gravity-induced reaction forces.

To identify a subscriber for network access according to the present embodiment, the computing device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1110 or performed using other techniques.

The computing device 1000 also includes an operating system 1460 and software components 1480 that are executed by the processor 1020 and which may be stored in a persistent data storage device such as the flash memory 1110. Additional applications may be loaded onto the computing device 1000 through the wireless network 1500, the auxiliary I/O subsystem 1240, the data port 1260, the short-range communications subsystem 1320, or any other suitable device subsystem 1340.

In use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the computing device 1000 may be similar. The speaker 1280 may output audible information converted from electrical signals, and the microphone 1300 may convert audible information into electrical signals for processing.

Figure 3:
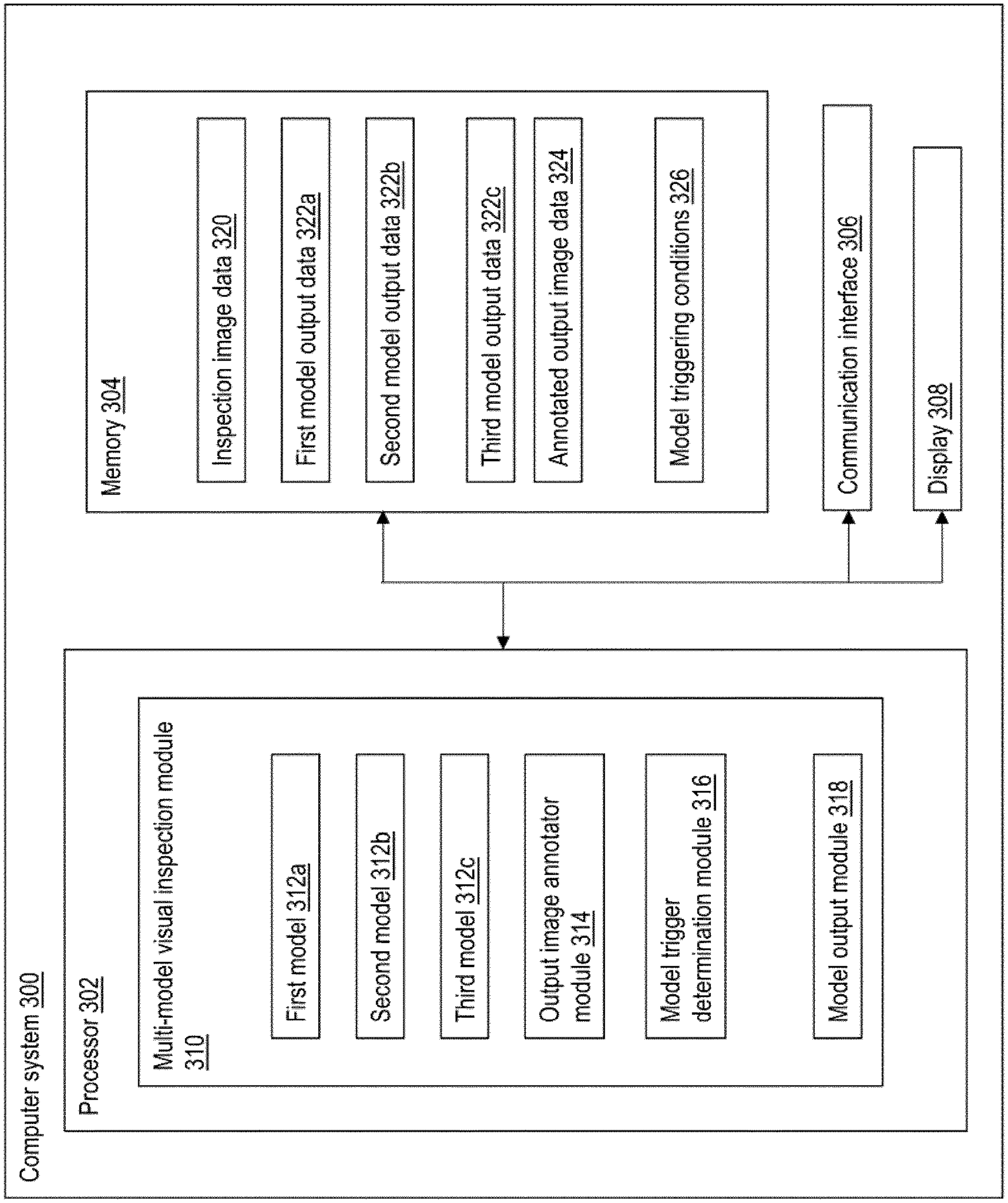
FIG. 3 is a block diagram of a computer system for automated visual inspection, according to an embodiment.

Referring now to FIG. 3, shown therein is a block diagram of a computing system 300 for automated visual inspection, according to an embodiment. The computer system 300 may be implemented at one or more devices of the automated visual inspection system 10 of FIG. 1. For example, components of the computer system 300 may be implemented by any one or more of the AI visual inspection device 12, the operator device 16, and the PLC device 18 of FIG. 1.

The system 300 includes a processor 302 for executing software models and modules.

The system 300 further includes a memory 304 for storing data, including output data from the processor 302.

The system 300 further includes a communication interface 306 for communicating with other devices, such as through receiving and sending data via a network connection (e.g., network 20 of FIG. 1).

The system 300 further includes a display 308 for displaying various data generated by the computer system 300 in human-readable format. For example, the display may be configured to display results of an inspection of the object to be inspected.

The processor 302 includes a multi-model visual inspection module 310. The multi-model visual inspection module 310 includes a plurality of machine learning models configured to perform object detection tasks. The plurality of machine learning models include a first object detection model 312*a*, a second object detection model 312*b*, and a third object detection model 312*c*. As previously noted, in other embodiments (such as embodiments directed to tasks other than visual inspection), the models 312 may be machine learning models configured to perform tasks other than object detection.

The multi-model visual inspection module 310 processes an image of an object to be inspected received from input module 306 through first model 312*a*, second model 312*b*, third model 312*c*, and so forth. It will be appreciated by the person of skill in the art that the multi-model visual inspection module 310 may contain further models for the visual inspection of an image of an object to be inspected. Some or all of the models contained within the multi-model visual inspection module 310 may be operative to inspect the image at any given time. Each of the models contained within multi-model visual inspection module 310 is trained to perform a particular object detection task unique to that model.

The memory 304 stores inspection image data 320. The computer system 300 receives the inspection image data 320 via the communication interface 306. The inspection image data 320 may be provided to the computer system 300 by a camera device (e.g., camera 14 of FIG. 1) or other device such as a remote computing device or storage device.

This input may be received at the input module 306, for example, from the camera 14 of FIG. 1.

Through communication between the memory 304 and the processor 302, the inspection image data 320 is fed to the first model 312*a*. As an example, first model 312*a* may be configured to determine the class of object or the particular object, if any, shown in the inspection image data 320. As another example, first model 312*a* may be configured to detect the presence of a defect.

The result of analysis by first model 312*a* of the inspection image data 320 is stored in the memory 304 as first model output data 322*a*. First model output data 322*a* may comprise the inspection image data 320 with annotations, for example a geometric shape surrounding the region in which an object or defect is recognized and a further label identifying the object or defect. In other cases, the first model output data 322*a* may include only defect data (that is, data describing any objects identified by the model).

Model output 322 may be an image or image data. Model output 322 may be annotated with location information (e.g. coordinates, centroid/center position) concerning a part or a defect therein. Model output 322 may further be annotated with labels concerning the defect and a class assignment (e.g., a defect may be classified as a "scratch"). Model output 322 may be annotated with labels concerning a part and an assessment of assembly (e.g., a seal on a part may be identified as properly placed).

The processor 302 includes a model trigger determination module 316. The model trigger determination module 316 may be located within the multi-model visual inspection module 310. The first model output data 322*a* is provided to the model trigger determination module 316 at the processor 302. The model trigger determination module 316 uses the first model output data 322*a* as input to determine to which other models, if any, of the processor 302 the inspection image data 320 should be provided. The model trigger determination module 316 may use artificial intelligence and/or machine learning to make this and other determinations.

For example, if first model 312*a* determines that the inspection image data 320 depicts a particular mechanical part (such as by performing object detection to determine a class label corresponding to the part and location information for the part), the model trigger determination module 316 may determine that the inspection image data 320 (or a subset thereof) should then be provided to a second model 312*b*. By contrast, if first model 312*a* determines that the inspection image data 320 does not depict a particular mechanical part either because the determination is not conclusive or because the inspection image data is unclear, the model trigger determination module 316 may instead determine that the inspection image data 320 should be sent to a third model 312*c* for further processing. Alternately, where the inspection image data 320 depicts a second particular mechanical part, the inspection image data 320 is provided to the third model 312*c* for further processing.

As a further example, first model 312*a* may be configured to detect a particular part, area, or region on an object or article. The detected part, area, or region may be prone to developing particular types of defects. Accordingly, it may be advantageous to determine when such a part, area, or region on the object or article is present (i.e. detected by an object detection model configured to detect the presence of the part, area, or region in image data) and to perform defect detection that is targeted to that particular part, area, or region. When the part, area, or region is detected by first model 312*a*, the inspection image data 320 may then be provided to second model 312*b*, which may be configured to detect defects in that part, area, or region. The defects the second model 312*b* is configured to detect may be defects that are specific to the part, area, or region previously detected by the first model 312*a* (i.e. it may make sense to only perform defect detection for those specific defects in the detected part, region, or area). The determinations of whether to use the second model 312*b* based on the output of the first model 312*a* are performed according to the model triggering conditions 326 stored at the memory 304.

As a further example, first model 312*a* may be configured to detect the presence of a defect. If first model 312*a* detects a defect in an object to be inspected, the model trigger determination module 316 may determine that the inspection image data 320 should be sent to a second model 312*b* to further localize the defect and/or to third model 312*c* to further classify the defect.

As a further example, first model 312*a* may be configured to detect the presence of a particular part in the inspection image data 320. If that part is present, the model trigger determination module 316 may determine that the inspection image data 320 should be sent to a second model 312*b* to determine whether the assembly of the part is correct. For example, if the part is a seal ring assembly, second model 312*b* may verify the placement of the seal. The model trigger determination module 316 may then determine that the inspection image data 320 should be further sent to third model 312*c* to detect the presence of defects in inspection image data 320. Assembly detection and defect detection as herein described may be performed simultaneously or sequentially at different models 312.

The above steps may be repeated with respect to providing inspection image data 320 to the second model 312*b*. The second model output data 322*b* is stored at the memory 304 and also provided to the model trigger determination module 316 at the processor 302. Depending upon the determination of model trigger determination module 316 with respect to second model output data 322*b*, the inspection image data 320 may be provided to third model 312*c* or to further models.

Alternately, after analysis by a model 312 is complete, the model trigger determination module 316 may send the inspection image data 320 to multiple other models 312 simultaneously or in sequence. For example, after analysis by first model 312*a* is complete, the model trigger determination module may send the inspection image data 320 to both second model 312*b* and third model 312*c*, or first to second model 312*b* and then to third model 312*c*. The sending of the inspection image data 320 to third model 312*c* may take place in addition to any further sending of the inspection image data 320 as determined by the model trigger determination module 316. The sending of inspection image data 320 to multiple models 312 may take place according to a depth-first approach, a breadth-first approach, or any other approach.

Determinations made by the model trigger determination module 316 are informed by preset model triggering conditions 326 stored at the memory 304. Such model triggering conditions 326 may also be set or modified based on user input. For example, model triggering conditions 326 may include that, if the inspection image data 320 depicts a particular mechanical part as determined by first model 312*a*, then inspection image data 320 should be provided to either or both of second model 312*b* and/or third model 312*c*. Model triggering conditions 326 may include second model triggering conditions and third model triggering conditions. Model triggering conditions 326 correspond to outputs from a model 312 that are used by the model trigger determination module 316 to determine which model or models 312 to trigger for subsequent analysis of inspection image data 320. The model trigger determination module 316 may generate a list of models 312 to be triggered in sequence. Accordingly, a given model output data 322 may trigger the use of a subsequent given model 312.

Accordingly, each of the models 312 that should have had an opportunity to analyze the inspection image data 320 according to the model triggering conditions 326 will have had an opportunity to do so. This approach advantageously ensures that each of the models 312 is able to perform specialized analysis without "drifting" from that functionality by accommodating further tasks. The multi-model approach further and advantageously may result in increased efficiency in terms of computational time and resources as models 312 are triggered for use only when circumstances warrant their use (i.e., the system 300 determines that a certain model or models 312 should be used based on an output of another model 312).

Once analysis by the models 312 has concluded, the model output data 322 (e.g., first model output data 322*a*, second model output data 322*b*, third model output data 322*c*), or a subset or parts thereof, are combined by output image annotator module 314.

The combination of model output data 322 produced by the output image annotator module 314 is stored in the memory 304 as annotated output image data 324. Annotated output image data 324 may comprise the inspection image data 320 with annotations such as coordinates (e.g., defining a bounding box) of a detected object such as a defect or part, and/or a detected object class label (e.g. a defect type/class, a part type/class, a part assembly status).

In some cases, output image annotator module 314 may use model output data 322 to generate annotated output image data 324, which is stored in the memory 304.

Annotated output image data 324 is provided by model output module 318 to be displayed to the user at display 308.

Figure 4:
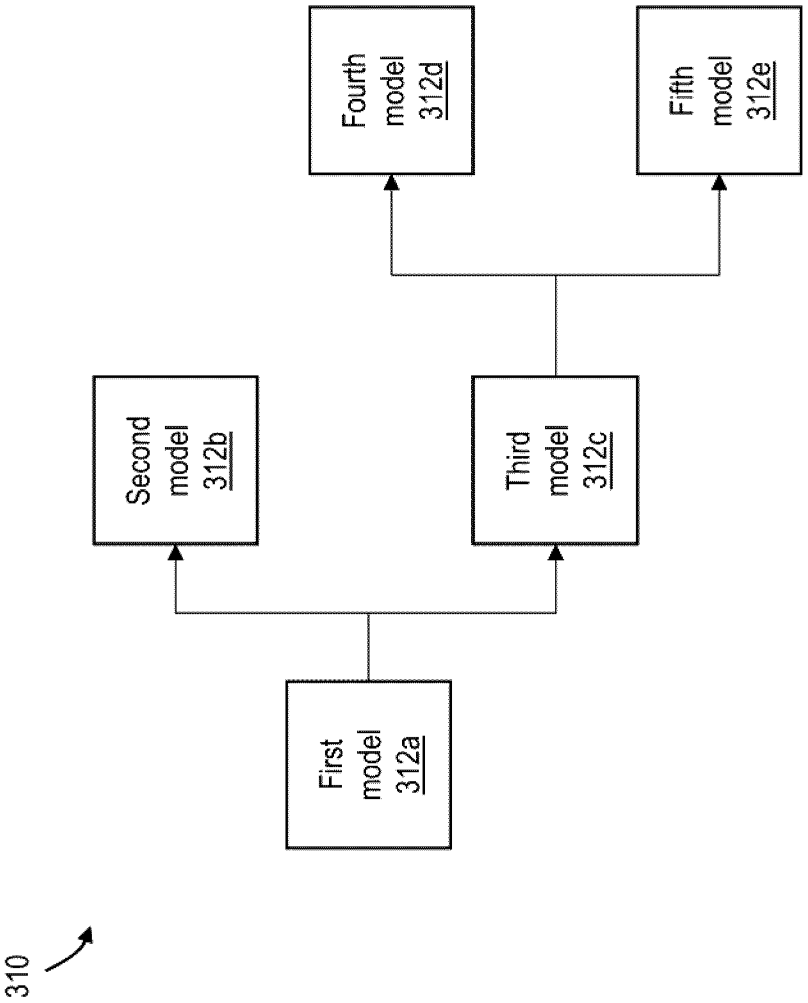
FIG. 4 is a block diagram of the multi-model visual inspection module of FIG. 3, according to an embodiment.
Figure 5:
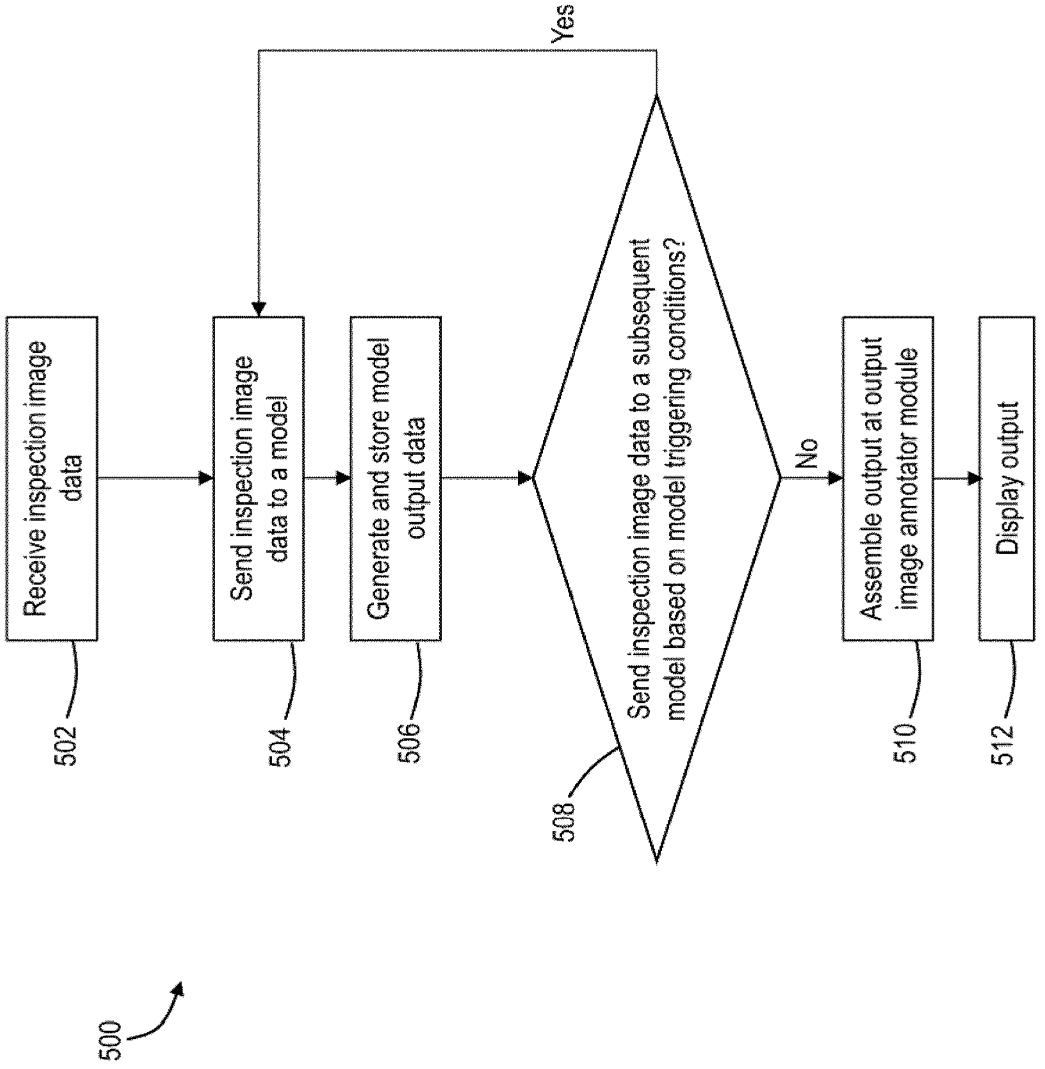
FIG. 5 is a flow diagram of a method of automated visual inspection using the multi-model visual inspection module of FIG. 3, according to an embodiment.

Referring now to FIGS. 4 and 5, shown therein are a multi-model visual inspection module 310 for automated visual inspection and method 500 for performing visual inspection using the multi-model visual inspection module 310, according to an embodiments.

At the multi-model visual inspection module 310, first model 312*a* receives inspection image data 320 and generates first model output data 322*a*. The first model output data 322*a* is provided to the model trigger determination module 316 for analysis in view of the model triggering conditions 326. According to the first model output data 322*a*, the model trigger determination module 316 may determine that the inspection image data 320 should subsequently be provided to second model 312*b*. According to second model output data 322*b*, the model trigger determination module 316 may determine that the inspection image data 320 should subsequently be provided to third model 312*c*. Alternately, the model trigger determination module 316 may determine that the inspection image data 320 should subsequently be provided to third model 312*c* immediately after first model 312*a*. Such determination is made according to the model triggering conditions 326 stored at the memory 304, which include a second model triggering condition and a third model triggering condition. The second model 312*b* and the third model 312*c* are triggered upon the second model triggering condition and the third model triggering condition being satisfied, respectively, based on analysis of the first model output data 322*a*. Triggering a model may include, for example, providing inspection image data, or a subset thereof, to an input layer of the triggered model to generate an output.

Upon the model trigger determination module 316 determining to proceed to third model 312*c*, a similar determination may then be made by the model trigger determination module 316 with respect to proceeding to either fourth model 312*d* or fifth model 312*e* (or both) based on third model output data 322*c*.

The model trigger determination module 316 may be configured to evaluate all model triggering conditions in light of the received model output data 322, for example by running through each condition to determine whether the condition is satisfied. In other cases, the model trigger determination module 316 may be configured to analyze the received model output data 322 and from this analysis may determine which subset of the model triggering conditions 326 are to be evaluated by the particular model output data 322 (e.g. by determining from the output that the output received is an output of a particular model). This technique may be applied where only a certain subset of the models 312 may be triggered (or not) for a given model output data 322, and thus only the model triggering conditions for those potentially triggered models should be evaluated. For example, if the second model 312*b* is the only model that can be triggered (or not triggered) by the output data 322*a* of the first model 312*a*, then the model trigger determination module 316 may be configured, upon determining that a received output is output data 322*a* from the first model 312*a*, to evaluate the output data 322*a* using the second model triggering condition(s) only (and not bothering to evaluate using the third model triggering condition as it would be unnecessary and inefficient).

The model trigger determination module 316 may be configured to maintain a list or other data structure indicating which models 312 are to be triggered based on the analysis performed by the model trigger determination module 316. The list of triggered models 312 (which may include 0 to N models, where the system 300 has N models) may then be used to trigger the models 312 sequentially to perform their respective analyses.

In an embodiment, the multi-model visual inspection module 310 may include a single model trigger determination module 316 in communication with each of the one or more models 312. The output data of each model 312 is provided to be analyzed by the single model trigger determination module 316.

In another embodiment, the model trigger determination module 316 may include a plurality of model trigger determination modules wherein a model trigger determination module may be interposed within pairs of models (not shown) (for example, between first model 312*a* and second model 312*b* and between first model 312*a* and third model 312*c*) to control locally where inspection image data 320 is further sent. Such model trigger determination modules may instead be associated with each subsequent model 312 (such as 312*b* and 312*c*) rather than interposed between a prior model 312 (such as 312*a*) and a subsequent model 312 (such as 312*b* or 312*c*).

In another embodiment, each model 312 may contain a model trigger determination module internally (not shown), which model trigger determination module makes the same determination with respect to further sending of inspection image data 320. In such an embodiment, the model trigger determination module is configured to determine satisfaction of model triggering conditions 326 based on analysis of that model's own output data.

In another embodiment, each model trigger determination module may be arranged according to any of the previous embodiments, i.e., some may be interposed within pairs of models, some may be associated with a subsequent model, and some may be contained internally within a model such that no one such status describes all the model trigger determination modules.

In each of the above configurations of the model trigger determination module 316, there may still be only a single model trigger determination module 316 in the multi-model visual inspection module 310 that is represented virtually either within or in between each of the models 312 as described above.

After analysis by a model 312 is complete, the model trigger determination module 316 may send the inspection image data 320 to multiple other models 312 simultaneously or in sequence. For example, after analysis by first model 312*a* is complete and the first model output data 322*a* is generated, the model trigger determination module may send the inspection image data 320 to both second model 312*b* and third model 312*c*, or first to second model 312*b* and then to third model 312*c*. The sending of the inspection image data 320 to third model 312*c* may take place in addition to any further sending of the inspection image data 320 as determined by the model trigger determination module 316. The sending of inspection image data 320 to multiple models 312 may take place according to a depth-first approach, a breadth-first approach, or any other approach.

In some cases, the model trigger determination module 316 is configured to orchestrate the sequence of operation of the models 312, which may occur across multiple determinations based on different model output data 322. For example, the model trigger determination module 316 may maintain a list or other data structure indicating the models 312 that are to be triggered, such as by initiating the provision of inspection image data 320 (or a subset thereof) to the respective model 312. Such list of triggered models (or more accurately, models to be triggered) 312 may be dynamically updated as analysis by the models 312 continues. For example, based on an analysis of first model output data 322*a*, the model trigger determination module 316 may determine a first list of models 312 to be triggered based on the output. This first list may include multiple models 312. The model trigger determination module 316 initiates the provision of the inspection image data 320 (or a subset thereof) to the first listed model in the first list of models 312. The first listed model 312 analyzes the inputted inspection image data and generates its own output data 322 that is provided to the model trigger determination module 316. The model trigger determination module 316 may then generate a second list of models 312 to be triggered based on the output 322 of the first listed model 312 in the first list of models 312. The model trigger determination module 316 may then dynamically update the list of models 312 to be triggered to include the second list of models 312 (in addition to the previously determined first list of models 312). In this way, the model trigger determination module 316 can manage new model trigger determinations as models 312 are triggered and generate new model output data 322 to be analyzed.

Referring now to FIG. 4 in particular, shown therein is a block diagram of the multi-model visual inspection module of FIG. 3. In an embodiment, the multi-model visual inspection module 310 may, after the first model 312*a* outputs the first model output data 322*a*, cause the inspection image data 320 to be sent to either or both of the second model 312*b* and/or the third model 312*c*. Similarly, after the third model 312*c* outputs the third model output data 322*c*, the multi-model visual inspection module 310 may cause the inspection image data 320 to be sent to either or both of the fourth model 312*d* and/or the fifth model 312*c*. Determination by the multi-model visual inspection module 310 takes place according to whether the model triggering conditions 326 stored in the memory 304 are satisfied.

Referring now to FIG. 5 in particular, shown therein is a method 500 of performing automated visual inspection, according to an embodiment. The method 500 may be implemented by the computer system 300 of FIG. 3. The method 500 may be directed to automated visual inspection of an object for object detection; the method 500 may also be directed to further uses in other contexts.

At 502, the system 300 of FIG. 3 receives inspection image data 320, for example from camera 14 of FIG. 1.

At 504, the multi-model visual inspection module 310 sends the inspection image data 320 to a model 312, for example to first model 312*a*.

At 506, the multi-model visual inspection module 310 stores model output data 322 generated by the object detection model 312, for example first model output data 322*a* generated by first model 312*a*. The model output data 322 is stored in the memory 304.

At 508, the model trigger determination module 316 determines whether to send the inspection image data 320 to a subsequent model 312 (i.e. whether one or more other models 312 should be triggered), for example second model 312*b*. This determination is made based on the model output data 322 (e.g., first model output data 322*a*) from 506 and according to model triggering conditions 326.

Where the model trigger determination module 316 determines "yes" at 508, steps 504 through 506 are repeated for a subsequent model 312, for example second model 312*b*.

Where the model trigger determination module 316 determines "no" at 508, the method 500 instead proceeds to 510.

At 510, all the model output data 322 (for example, first model output data 322*a* and second model output data 322*b*) are assembled by output image annotator module 314 as a single annotated output image data 324 stored in the memory 304.

At 512, model output module 318 sends the annotated output image data 324 to display 308 to be displayed to the user. This may include rendering the annotated output image in a graphical user interface. In some cases, the user interface may be implemented at a user device, such as operator device 16 of FIG. 1, and the annotated output image is sent to the user device, such as through network connection (e.g., network 20 of FIG. 1).

Figure 6:
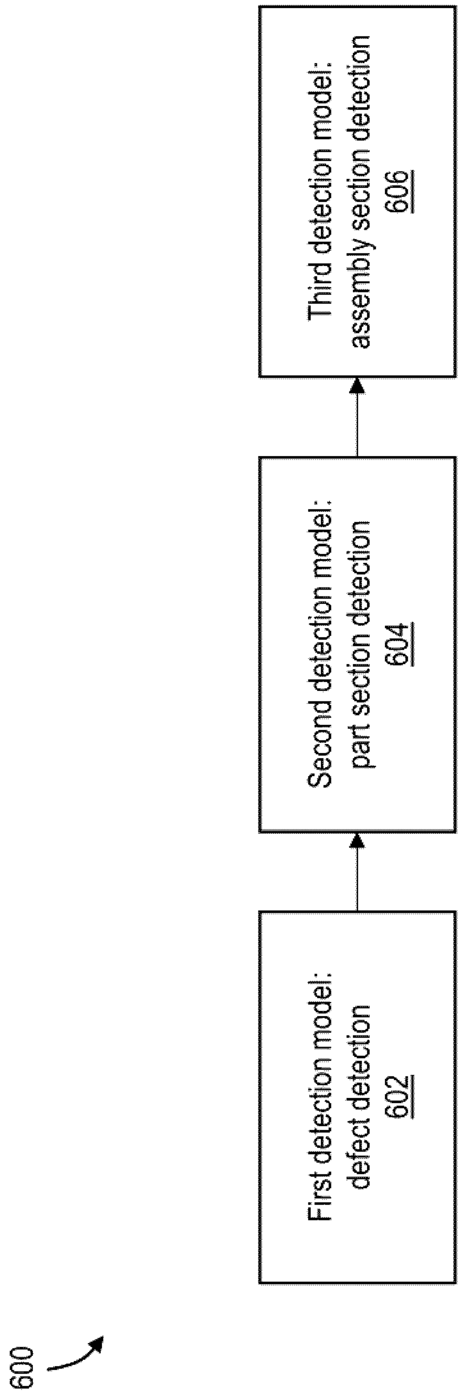
FIG. 6 is a block diagram of an automated visual inspection system, according to an embodiment.
Figure 7:
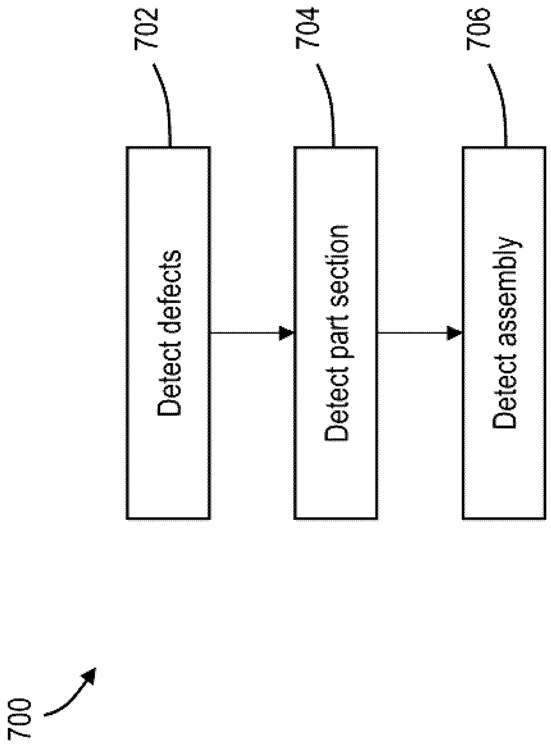
FIG. 7 is a flow diagram of a method of automated visual inspection using of the automated visual inspection system of FIG. 4, according to an embodiment.

Referring now to FIGS. 6 and 7, shown therein are an embodiment 600 of the multi-model visual inspection module 310 for automated visual inspection and a method 700 of performing visual inspection using the multi-model visual inspection module 600 of FIG. 6.

The module 600 comprises a first object detection model 602, a second object detection model 604, and a third object detection model 606. While the models 602, 604, 606 are described as having a particular order or sequence, it is to be understood the order in which the models are presented (and triggered) may be changed in other embodiments.

The module 600 includes a first detection model 602. The first detection model 602 is a defect detection model configured to detect multiple classes of defects in an input image. The defect classes include scratch, porosity, and dent. In other embodiments, the first detection model 602 may include fewer or additional defect classes.

At 702, first detection model 602 performs detection of defects in inspection image data 320 as previously described. The output of first detection model 602, for example first model output data 322*a*, is stored at the memory 304. The output of first detection model 602 may comprise the inspection image data 320 with annotations, for example a geometric shape surrounding the region in which a defect is recognized and a label identifying the defect type/class. In other cases, the output of first detection model 602 may include only defect data (that is, data describing any defect identified by the model).

The module 600 includes a second detection model 604. The second detection model 604 is a part section (or "section") model configured to detect multiple classes of part sections in an input image. The part section classes include a VTC class, a journal class, a lobe class, and a sensor ring class. The second detection model 604 detects and localizes part sections in the input image, such as by generating a bounding box enclosing the part section and a part section class label. The part sections being detected may be considered "regions of interest" (and singularly as a "region of interest" or "ROI"). The second detection model 604 identifies the part sections that are present in the input image (which, in the case of a sequence of images, is the current image).

At 704, the second detection model 604 performs detection of individual parts and part sections in inspection image data 320 as previously described. The output of second detection model 604, for example second model output data 322*b*, is stored at the memory 304. The output of second detection model 604 may comprise the inspection image data 320 with annotations, for example a geometric shape surrounding the region in which a part or part section is recognized and a label identifying the part or part section (object class). In other cases, the output of second detection model 604 may include only part and/or part section data (that is, data describing any part and/or part section identified by the model).

The module 600 includes a third detection model 606. The third detection model 606 is an assembly detection model configured to detect multiple classes of assembly features in an input image. The assembly classes include a seal ring class and an oil hole class. Accordingly, the third detection model 606 detects and localizes assembly features in the input image, such as by generating a bounding box enclosing the assembly feature and an assembly feature class label, as well as other detected object data. In essence, the third detection model 606 determines whether a given assembly feature corresponding to an assembly feature class is present in the image.

At 706, the third detection model 606 performs detection of proper assembly in inspection image data 320 as previously described. The output of third detection model 606, for example third model output data 322*c*, is stored at the memory 304. The output of third detection model 606 may comprise the inspection image data 320 with annotations, for example a geometric shape surrounding the region in which an assembly is recognized and a label identifying the assembly (object class). In other cases, the output of third detection model 606 may include only assembly data (that is, data describing any assembly identified by the model).

An example of use of the module 600 and method 700 will now be described. Generally, the first model 602 looks for defects of different types in an inspection image of a camshaft. If a defect is found, the image is passed to the second detection model 604 to detect part sections. The decision to pass the image to the second detection model is based on the second model triggering condition being satisfied by the first model output data. The second detection model 604 locates and identifies key sections in the camshaft on the image. The module 600 checks if the defect(s) lie within the detected part section(s). This includes comparison of object location data for the detected objects (defect, ROI section). Further, if a part section of a particular class is detected in the image (i.e. in the output data), the image is passed to the third detection model 606 to determine (confirm) that specific assembly features are within that detected part section. The decision to pass the image to the third detection model is based on the third model triggering condition being satisfied by the second model output data.

It will be appreciated that, before inspection image data 320 is sent to each of the models 602, 604, and 606 of module 600, the model trigger determination module 316 may determine whether analysis by a particular model 602, 604, 606 is appropriate given the inspection image data 320 and any available output data 322 provided by models that have already analyzed inspection image data 320. Such a determination is made according to model triggering conditions 326. Further, in some cases, output data 322 generated by a model may be stored and used for analysis using output data 322 from a different model (e.g. comparing the two output data). For example, object data such as bounding box coordinates and a defect class label of a defect detected by the first model 602 may be stored and subsequently compared by the module 600 to object data of a part section detected by the second model 604. If a defect of a particular class is determined to be located within a part section of a particular class by comparing the bounding box coordinates, the module 600 may confirm the defect as unacceptable and initiate a corresponding downstream process. If the defect is of an acceptable class or lies outside the part section, the module 600 may tag the defect as acceptable and/or ignore the defect. Such an approach may be particularly advantageous where different part sections or regions of interest have different defect tolerances (e.g. certain types of defects are acceptable/unacceptable in certain regions of interest, defects below a threshold size are acceptable, etc.). It is to be understood that the foregoing concept can be applied to capture other relationships between "objects" that are detected using different models to provide enhanced functionality to the visual inspection system. In other words, output data 322 from different models may be analyzed or compared by the module 600 to determine a subsequent action, which may include triggering of another model and such comparison may be embodied in the model triggering conditions of the triggered model. For example, output data 322 of the first model 602 and second model 604 may be used in determining whether the third model 606 is to be triggered.

It will further be appreciated that each of models 602, 604, and 606 may contain further models performing further analysis or sub-analysis. For example, first detection model 602 may contain several "smaller" models, each of which may receive the inspection image data 320 to perform particular analyses or sub-analyses that are transmitted by first detection model 602.

Determinations as to which, if any, of the "smaller" models of the models 602, 604, 606 are sent inspection image data 320 are made by model trigger determination module 316 in accordance with model triggering conditions 326. As previously discussed, each model 602, 604, 606, or any submodels therein may contain additional model trigger determination modules therein or therebetween. Where such additional model trigger determination modules exist therein or therebetween, such additional model trigger determination modules may be virtual modules representing a single model trigger determination module 316 in module 600.

Referring now to FIG. 8, shown therein are illustrations of example images 800 of a camshaft used or generated by a visual inspection system employing a more conventional approach to object detection by having a single object detector performing multiple object detection tasks. The images 800 include an input inspection image 802 of the camshaft and an annotated output image 804 of the camshaft after visual inspection using the single object detector.

Image 802 is an inspection image of a camshaft. The inspection image 802 is provided as input to a single object detector that is configured to perform defect detection, part section detection, and assembly feature detection. The single object detector generates an annotated output image 804. The annotated output image 804 includes the inspection image 802 and various information overlayed the inspection image relating to defects, part sections, and assembly features detected by the single object detector. In particular, image 804 includes bounding boxes 806*a*-806*g* identifying detected objects. Box 806*a* is an output from section detection showing an ROI for VTC. Box 806*b* is an output from section detection finding a thrust section. Box 806*c* is an output from defect detection showing an identified defect. Boxes 806*d*-806*g* are visual representations of where defects and objects have been filtered (e.g. anything outside of certain areas is ignored).

Referring now to FIG. 9, shown therein are illustrations of example annotated output images 900 of a camshaft generated by the visual inspection system of the present disclosure, according to an embodiment. The system used to generate the images 900 may provide an improvement over the single detector system used with the images 802 of FIG. 8.

The images 900 may be generated by the computer system 300 of FIG. 3 or the AI visual inspection device 12 of FIG. 1. The images 900 include a first annotated output image 902, a second annotated output image 904, and a combined annotated output image 908.

Image 902 is an example image generated using a part section detection model, such as part section detection model 604 of FIG. 6. Image 902 is an embodiment of a model output 322. Image 902 contains annotation 906*a*, which includes a bounding box indicating the location in the image 902 in which a particular class of part section has been detected and a label corresponding to the class of part section.

Image 904 is an example image generated using a defect detection model, such as the defect detection model 602 of FIG. 6. Image 904 is an embodiment of a model output 322. Image 904 contains further annotations 906*b*-906*f*, which include bounding boxes indicating the locations in the image 904 in which certain defects are found and labels indicating the class of detected defect.

Images 902 and 904 are combined at output image annotator module 314 to produce annotated output image data 324.

Image 908 is an embodiment of annotated output image data 324. The image includes annotations generated from the part section and defect detection models (and present in the output images 902, 904 of those models). Image 908 contains annotations 906*a*-906*f*, which correspond to objects detected by the part section and defect detection models (and present in images 902, 904). The annotations include bounding boxes indicating the locations in the image 908 in which certain detected objects are located and labels indicating class of object.

In other embodiments, the image 908 may only include a subset of the annotations. Which subset of annotations are used or displayed may be determined automatically by the system (such as by the image annotator module 314 or other software logic) or may be based on an input provided by a user at user device. For example, which objects are retained or displayed may determined based on any one or more of meeting a confidence threshold, satisfying a specific region of interest ("ROI") filter, having a certain object class (e.g. removal of unnecessary classes/objects found), or the like.

The features referred to above may include any of defects, assemblies, and the presence or absence of particular parts or sections thereof on or in the object to be inspected.

Combined annotated output image 908 may be sent by model output module 318 to the display 308 for display to a user. The combined annotated output image 908 may also be stored in memory 304. In some cases, the combined annotated output image 908 may be sent to another device for storage, such as a cloud device for cloud storage and/or for analysis (e.g., to an analytics server) (not shown).

Although embodiments of the invention have been described such that, where the inspection image data 320 is sent to multiple models 312, each model 312 receives the inspection image data 320 in sequence, the associated systems, methods, and devices may be configured such that the models 312 receive the inspection image data 320 substantially and/or entirely in parallel/in tandem/at the same time.

While the above description provides examples of one or more apparatus, methods, or systems, it will be appreciated that other apparatus, methods, or systems may be within the scope of the claims as interpreted by one of skill in the art.

The invention claimed is:

1. A system for automated artificial intelligence ("AI") visual inspection using a multi-model architecture, the system comprising:

a camera device for acquiring inspection image data of a target object being inspected;

an AI visual inspection device comprising:

a memory storing a second model triggering condition for triggering use of a second neural network model;

a processor in communication with the memory, the processor configured to:

execute a first neural network model configured to detect a first object class in the inspection image and generate first neural network model output data including a first list of detected objects;

execute a model triggering determination module configured to determine whether the first neural network model output data satisfies the second model triggering condition;

execute the second neural network model upon satisfaction of the second model triggering condition, the second neural network model configured to perform a task on the inspection image different to detecting the first object class and generate second neural network model output data;

send via a communication interface neural network model output data to an operator device, the neural network model output data including the first neural network model output data and, if generated, the second neural network model output data;

the operator device configured to display the received neural network model output data;

wherein the first neural network output data includes an identifier that identifies that the second model triggering condition is to be used by the processor, wherein the identifier comprises model identification data identifying the first neural network model, and wherein the processor determines the second model triggering condition is to be used based on the identifier, wherein the identifier is a model number or a model name;

wherein upon determining the second model triggering condition is to be used the processor retrieves the second model triggering condition from the memory using the identifier in order to determine whether the first neural network model output data satisfies the second model triggering condition.

2. The system of claim 1, wherein the first neural network model output data further includes an object class label of a detected object, the second model triggering condition includes a required object class label, and the processor determines whether the object class label of the detected object matches the required object class label.

3. The system of claim 1, wherein the first neural network model output data further includes object location data of a detected object, the second model triggering condition includes an object location requirement, and the processor determines whether the object location data of the detected object meets the object location requirement.

4. The system of claim 1, wherein the first neural network model output data further includes a confidence level of a detected object, the second model triggering condition includes satisfying a minimum confidence level, and the processor determines whether the confidence level of the detected object meets the minimum confidence level.

5. The system of claim 1, wherein the first neural network model output data further includes object size data of a detected object, the second model triggering condition includes satisfying a minimum object size, and the processor determines whether the object size data meets the minimum object size.

6. The system of claim 1, wherein the first neural network model output data further includes object attribute data describing at least two attributes of a detected object, and wherein the at least two attributes include any two or more of an object location, an object class label, an object confidence level, and an object size.

7. The system of claim 6, wherein the second model triggering condition includes a requirement for each of the at least two attributes of the detected object, and wherein the processor is further configured to determine whether the object attribute data satisfies the requirement for each of the at least two attributes of the detected object.

8. The system of claim 1, wherein the inspection image provided to the second neural network model comprises a subset of the inspection image, the subset of the inspection image determined from the first neural network model output data, and wherein the second object detection task is performed using the subset of the inspection image.

9. The system of claim 1, wherein the processor is further configured to generate a list of neural network models to be executed by the processor based on the first neural network model output data, the list of neural network models to be executed including the second neural network model when the processor determines that the second model triggering condition is satisfied.

10. The system of claim 9, wherein the processor executes each of the neural network models in the list in series, the execution of a respective one of the neural network models including providing at least a subset of the inspection image to the respective one of the neural network models and generating neural network model output data using the respective one of the neural network models.

11. The system of claim 9, wherein the processor is further configured to dynamically update the list to include an additional neural network model to be executed, the additional neural network model to be executed determined by the processor based on neural network output data generated by a previously executed neural network model satisfying a model triggering condition of the additional neural network model stored in the memory.

12. The system of claim 9, wherein the list of neural network models to be executed comprises a plurality of separate lists of neural network models to be executed, each respective one of the plurality of separate lists of neural network models to be executed corresponding to a single neural network model.

13. The system of claim 1, wherein the operator device is configured to generate a user interface for receiving input data setting the second model triggering condition, and wherein the second model triggering condition is generated by either the operator device or the AI visual inspection device according to the input data.

14. The system of claim 1, wherein at least one of the first neural network model and the second neural network model is an image segmentation neural network model.

15. The system of claim 14, wherein the image segmentation neural network model is an instance segmentation neural network model.

16. A computer-implemented method of automated artificial intelligence ("AI") visual inspection using a multi-model architecture, the method comprising:

providing inspection image data as input to a first neural network model configured to detect a first object class in the inspection image data;

performing a first object detection task using the first neural network model, the first object detection task including generating first neural network model output data;

storing the first neural network model output data in a memory as inspection image annotation data;

determining whether the first neural network model output data satisfies a second model triggering condition stored in the memory;

if the first neural network model output data satisfies the second model triggering condition:

providing the inspection image data as input to a second neural network model;

performing a second task, different to the first object detection task, using the second neural network model, the second object detection task including generating second neural network output data; and storing the second neural network output data in the memory as a subset of the inspection image annotation data;

wherein the first neural network output data includes an identifier that identifies that the second model triggering condition is to be used by the processor, wherein the identifier comprises model identification data identifying the first neural network model, and wherein the processor determines the second model triggering condition is to be used based on the identifier, wherein the identifier is a model number or a model name;

wherein upon determining the second model triggering condition is to be used the processor retrieves the second model triggering condition from the memory using the identifier in order to determine whether the first neural network model output data satisfies the second model triggering condition.

17. The method of claim 16, further comprising generating an annotated inspection image using the inspection image data and the inspection image annotation data and displaying the annotated inspection image in a user interface.

18. The method of claim 16, wherein at least one of the first neural network model and the second neural network model is an instance segmentation neural network model.

* * * * *